United States Patent Office 3,541,204
Patented Nov. 17, 1970

3,541,204
**ENCAPSULATED BIOLOGICALLY ACTIVE MATE-
RIALS FOR FEEDING TO RUMINANTS AND
PROCESS FOR THE PRODUCTION THEREOF**
Ian Ramsay Sibbald, 587 Cheddington Place; Thomas
Crossley Loughheed, 67 Garden Wood Drive; and John
Herbert Linton, 182 Elworthy Ave., all of London, Ontario, Canada
No Drawing. Continuation-in-part of application Ser. No.
617,817, Feb. 23, 1967. This application Dec. 2, 1968,
Ser. No. 780,591
Int. Cl. A61j 3/07
U.S. Cl. 424—38                                    11 Claims

ABSTRACT OF THE DISCLOSURE

Controlled release capsules for feeding to ruminants in the form of capsules having a core containing biologically active material, e.g., amino acids, encapsulated in a material which is capable of passing through the rumen without releasing a substantial portion of the biologically active material and passing into the abomasum or anterior part of the small intestine, the environment of which modifies the encapsulating material and releases the biologically active material for utilization by the animal.

---

This is a continuation-in-part of U.S. application Ser. No. 617,817, filed Feb. 23, 1967. Now abandoned.

BACKGROUND OF THE INVENTION

Field of the invention

The invention relates to encapsulated biologically active materials for feeding to ruminants.

Description of the prior art

It has been widely established that very significant increases in animal feed efficiencies can be obtained by the use of certain feed additives. This has been particularly true in the feeding of monogastrics where it is now the usual practice to supplement the diet with such materials as amino acids. The use of amino acids in animal feeds is described in Block et al. Canadian Pat. No. 429,111, issued July 31, 1945, while Baldini et al. Canadian Pat. No. 561,699, issued Aug. 12, 1958, describes the use of the amino acid methionine. The amino acids represent a particularly useful group of additives since they are the units from which protein molecules are constructed. Although many biologically active materials are employed as feed additives, it is recognized that many of these are inefficiently utilized by ruminants due to degradation thereof in the rumen. Thus, materials such as amino acids and vitamins are not used routinely in ruminant feeds because of their susceptibility to ruminal degradation.

It is also common practice to include antibiotics, such as penicillin and tetracycline, in feeds for monogastrics but these have also presented difficulties when included in ruminant feeds. Thus, large amounts of antibiotics in the rumen may interfere with the rumen fermentation while small amounts of antibiotics may be destroyed by the rumen microflora.

Under practical conditions the feeds consumed by ruminants contain a variety of nitrogenous compounds. The feed, mixed with saliva, enters the rumen which is essentially a continuous fermenter. Some of the feed entering the rumen may be subsequently eructated and remasticated to reduce particle size. Within the rumen, microfloro attack the feed and reduce some of the nitrogenous compounds to ammonia. A portion of the ammonia passes through the rumen wall into the portal blood which transports it to the liver. Within the liver some of the ammonia is converted to urea some of which reenters the rumen via the saliva; much of the remaining urea is excreted in the urine. The rumen microflora utilize ruminal ammonia and other nitrogenous compounds to synthesize microbial proteins. A stream of ingesta, rich in microbial cells, passes out of the rumen into the omasum whose function may be likened to that of a press. Much of the liquid reenters the rumen while the remainder of the material enters the abomasum or true stomach. Nitrogen digestion and absorption then proceeds in a similar manner to that found in monogastrics. Enzymes secreted into the lumen of the gut digest many of the nitrogenous compounds, including some of those contained in the microbial cells. The products of digestion are either excreted as faeces or are absorbed. The absorbed nitrogenous compounds may be used, inter alia, to repair worn out tissues, to build new tissues or to supply energy. Surplus absorbed nitrogen is excreted via the urine or saliva. In addition to the foregoing, some of the cells lining the intestinal tract are sloughed off during the passage of ingesta. The nitrogenous components of the cells from the intestinal tract may be processed in a similar manner to the microbial cells.

The rumen has the great advantage of being able to convert by microbial action many feed components which have no direct nutritive value for the host into products which can be assimilated and utilized by the host. For example, urea may be converted to microbial protein which subsequently may be digested and utilized by the host animal and cellulose may be converted to a mixture of volatile fatty acids which can serve as a source of energy to the host.

This microbial action also presents certain disadvantages. For instance, soluble proteins of high nutritive value may be digested and deaminated in the rumen and in part be resynthesized into microbial protein of lower nutritive value. Amino acids, the units from which protein molecules are constructed, are also subjected to chemical change by the rumen microorganisms which have been observed to convert amino acids to carbon dioxide, volatile fatty acids and ammonia.

We have also shown that the spectrum of amino acids available for absorption by the ruminant is unbalanced in terms of the requirements for maximum efficiency and productivity. Under certain conditions it was shown that methionine and lysine were the most limiting amino acids in growing steers. Direct infusion of methionine and/or lysine solutions into the abomasa of growing steers elicited marked improvements in weight gain, feed efficiency and nitrogen retention.

The infusion of an amino acid into the abomasum of a steer also tended to result in an increase in the level of that amino acid in the blood plasma.

Thus, very remarkable increases in feeding efficiencies can be achieved in ruminants if supplemental amino acids can be made available for absorption by the animal. However, because of the microbial action in the rumen, amino acid supplements in ruminant feeds have rarely elicited beneficial responses.

SUMMARY OF THE INVENTION

According to this invention, it has been found that biologically active materials, such as amino acids, vitamins, antibiotics, etc. can be transported through the rumen so that they exert their biological effects posterior to the omasum if the materials are fed in the form of particles, e.g. capsules, prills, granules or the like, in which the active materials are totally encased in a continuous film of protective material which is substantially immune to degradation in the rumen but which releases the active materials posterior to the omasum. Thus, the particles can pass through the rumen substantially unchanged to a location posterior to the omasum where the biologically active material is made available for utilization by the animal. These particles will be referred to hereinafter as "capsules."

Some active materials, such as amino acids, may be absorbed from the intestinal tract and utilized within the body proper of the host animal, while other active materials may express their activity within the lumen of the gut.

The capsules can be prepared by a wide variety of known encapsulating techniques, e.g. fluidized bed techniques, centrifugal extrusion encapsulation devices, prilling etc. and any protective material can be used which will not release the active material in the rumen fluid but will release the active material posterior to the omasum and is tolerable to the animal. Thus, the capsules can be formed with a continuous outer shell of protective material or they can be formed without a distinct outer shell if the active material is encapsulated in pockets in a matrix of protective material. However, it is important that the active material is completely encased in protective material since the capsules must be capable of withstanding long periods of time in the rumen without having large amounts of active material leached out of the capsules by the rumen fluid.

DESCRIPTION OF THE PREFERRED EMBODIMENTS

The size of the capsules may vary over a wide range, but it is preferable that they be sufficiently large that they cannot be readily engulfed by the rumen protozoa. The maximum size is limited only by that which can be administered to the animal as an integral part of the feed. For routine use as a feed additive, a capsule diameter ranging from about 200 to about 2,000 microns is normally used, and a diameter in the range of about 30–400 microns is particularly preferred.

The density of the capsules must be sufficient to ensure that they do not remain floating on the surface of the rumen contents for an undue period of time and, at the same time the density must not be so great that the capsules fall to the floor of the rumen and remain there indefinitely. The capsules generally have a density of about 0.8–2.0 and preferably about 1.0–1.4. The capsule density can be conveniently regulated by varying the ingredients forming the core of the capsule, e.g. by the addition of a high density weighting agent such as kaolin, chromium sesquioxide or barium sulfate.

The protective material must be essentially insoluble and impermeable in the rumen and must also have a melting point higher than the temperature of the rumen fluid. Furthermore, it must be substantially non-degradable by rumen microorganisms within the time of residence in the rumen.

Since the active material in the capsules should be released posterior to the omasum, e.g. in the abomasum or anterior part of the small intestine, the protective material can be a material which becomes permeable or dissolved in the abomasum, duodenum or jejunum. The protective material can be modified by the low pH of the abomasum or may be disrupted by bile salts or by enzymes or by a combination of these factors. Among satisfactory protective materials there can be mentioned triglycerides such as hydrogenated vegetable and animal fats, waxes such as rice bran wax, resin-wax blends and formolized gelatin which may be emulsified, disrupted or dissolved by bile salts or enzymes, of the intestinal tract.

As stated hereinbefore, the capsules can be formed with a continuous outer shell of protective material or they can be formed without a distinct outer shell if the active material is encapsulated in pockets in a matrix of protective material. Particularly high quality capsules have been obtained in which the core includes a matrix of the same material as is used for the outer shell. Hydrogenated animal fat and rice bran wax have been found to be particularly satisfactory for use as both shell and core matrix. It has also been found to be beneficial to include some resin materials in the shell, such as low molecular weight polyethylene or glycerol esters of hydrogenated resin.

The capsules can be conveniently fed to the animals as part of a feed concentrate or in conjunction with mineral, such as salt. Feeding the capsules mixed with mineral has the important advantage of permitting the feeding of controlled amounts of capsules to grazing animals based on their self-regulated consumption of mineral.

Of the many amino acids known to exist, approximately 22 are found in animal tissues. A response to a supplemental amino acid will only be obtained if that amino acid is the most deficient relative to the other amino acid deficiencies, providing that there is not a general shortage of non-specific amino nitrogen. A deficiency of certain amino acids may limit the growth and/or productivity of the animal and in fact, an acute deficiency may result in death.

A comparison of estimated amino acid requirement data with observed values for free acids in the blood plasma of a growing steer is illustrated in Table I below.

TABLE I

| Amino acid | Requirement (A) | Blood plasma p.p.m. (B) | Ratio (C) | (C) as percent of (A) (D) | Order of limitation |
|---|---|---|---|---|---|
| Lysine | 1.00 | 15.1 | 1.00 | 100 | 2 |
| Arginine | 0.60 | 16.6 | 1.10 | 183 | 9 |
| Histidine | 0.33 | 11.0 | 0.73 | 221 | 11 |
| Threonine | 0.60 | 9.3 | 0.62 | 103 | 3 |
| Methionine | 0.45 | 6.0 | 0.33 | 73 | 1 |
| Cystine | 0.25 | 6.4 | 0.42 | 168 | 6 |
| Valine | 0.80 | 30.2 | 2.00 | 250 | 12 |
| Leucine | 0.90 | 17.2 | 1.14 | 127 | 5 |
| Isoleucine | 0.60 | 15.8 | 1.05 | 175 | 8 |
| Phenylalanine | 0.70 | 11.5 | 0.76 | 108 | 4 |
| Tyrosine | 0.35 | 9.2 | 0.61 | 174 | 7 |
| Tryptophan | 0.20 | 6.7 | 0.44 | 220 | 10 |

From the above data it will be seen that methionine was found to be first limiting followed by lysine and threonine. On the basis of this information a test program was set up to study the affects of both abomasal infusion and oral administration of methionine and lysine in growing steers.

Although the above data applied to growing steers, it will be appreciated that corresponding data can be calculated for other ruminants under varying conditions, e.g. for milking cows, sheep, etc.

The invention will now be illustrated by the following non-limitative examples:

The solutions were infused by means of a Harvard pump at a rate of 750 ml. per head per day, on a continuous basis, calculated to supply 15 gm. of lysine and/or methionine and the test was continued for 14 days.

Following the conclusion of the infusion portion of the experiment a sample of venous blood was drawn from a jugular vein of each animal. The citrated blood was centrifuged and samples of the plasma were deproteinized. The deproteinized plasma was then assayed for free amino acids using the Technicon Auto-analyzer.

Weight change, feed consumption, feed efficiency and nitrogen retention data for the above experiment are tabulated in Table II.

TABLE II.—WEIGHT CHANGE, FEED CONSUMPTION AND NITROGEN RETENTION DATA

| Treatment | Replication | Average body weight[1] Initial, kg. | Average body weight[1] Final, kg. | Weight change, kg. | Feed consumed Hay, kg. | Feed consumed Concentrate, kg. | Feed efficiency Hay | Feed efficiency Concentrate | Feed efficiency Total | Weight change as percent of control | Total feed efficiency as _ercent of control | Nitrogen retained, gm. | Gross nitrogen retained, percent |
|---|---|---|---|---|---|---|---|---|---|---|---|---|---|
| Control | A | 179.94 | 189.44 | 9.50 | 61.915 | 12.317 | 6.52 | 1.30 | 7.81 | 100 | 100 | 160.94 | 13.31 |
|  | B | 181.19 | 188.94 | 7.75 | 57.675 | 11.487 | 7.44 | 1.48 | 8.92 | 100 | 100 | 69.83 | 6.22 |
|  | Mean | 180.56 | 189.19 | 8.62 | 59.595 | 11.902 | 6.93 | 1.38 | 8.31 | 100 | 100 | 115.16 | 9.89 |
| Lysine | A | 173.88 | 183.56 | 9.68 | 55.525 | 11.105 | 5.74 | 1.15 | 6.88 | 102 | 88 | 89.08 | 7.94 |
|  | B | 172.69 | 181.75 | 9.06 | 58.605 | 11.527 | 6.47 | 1.27 | 7.74 | 117 | 87 | 177.74 | 15.06 |
|  | Mean | 173.28 | 182.66 | 9.37 | 57.065 | 11.316 | 6.09 | 1.21 | 7.30 | 109 | 88 | 133.41 | 11.58 |
| Methionine | A | 158.19 | 169.75 | 11.56 | 46.480 | 9.419 | 4.02 | 0.81 | 4.84 | 122 | 62 | 108.77 | 11.72 |
|  | B | 178.69 | 189.75 | 11.06 | 63.535 | 11.494 | 5.74 | 1.04 | 6.78 | 143 | 76 | 210.89 | 17.09 |
|  | Mean | 168.44 | 179.75 | 11.31 | 55.008 | 10.456 | 4.86 | 0.92 | 5.79 | 131 | 70 | 159.83 | 14.78 |
| Methionine and lysine | A | 179.94 | 190.88 | 10.94 | 64.550 | 12.832 | 5.90 | 1.17 | 7.07 | 115 | 90 | 222.16 | 16.80 |
|  | B | 170.31 | 180.25 | 9.94 | 56.745 | 11.399 | 5.71 | 1.15 | 6.86 | 128 | 77 | 160.86 | 13.75 |
|  | Mean | 175.14 | 185.56 | 10.44 | 60.648 | 12.116 | 5.81 | 1.16 | 6.98 | 121 | 84 | 191.51 | 15.36 |

[1] Each value based on 4 consecutive daily weighings.

EXAMPLE 1

The purpose of this experiment was to study the effects of abomasal infusions of methionine and/or lysine on the performances of growing steers offered a hay:concentrate diet on an ad libitum basis.

A group of 8, Holstein-type, bull calves were weaned to a diet of coarse hay and when they were about 13 weeks of age, each animal was fitted with an abomasal cannula designed and manufactured by Dr. G. D. Phillips of the University of Manitoba. Two weeks later the calves were castrated and dehorned.

The experiment was of a randomized block design with two replications and 4 treatments. The latter, which were arranged as a 2 x 2 factorial, involved the abomasal infusion of solutions of lysine and/or methionine.

The steers were placed in individual metabolism crates and were offered as much hay as they could consume. Their diet also included a feed concentrate which was divided into two meals per day and was equal to 20% of the hay consumption of the previous day. Residual feed was removed once per day, weighed and sampled.

Urine was collected on a daily basis in plastic jerrycans to which had been added 500 ml. of 4% boric acid solution. The daily urine collected was diluted with cage washings and tap water to a volume of 8 liters, thoroughly mixed and then sampled.

A faeces harness and collection bag was connected to each animal and the collection bags were changed three times per day. The weight of the faeces voided was recorded and a representative sample retained.

The dry matter contents of the hay, hay residue and faeces samples were determined by the method of the A.O.A.C. The A.O.A.C. micro-kjeldahl technique was employed to measure the nitrogen content of hay, hay residues, faeces, urine and test solutions.

Four abomasal infusion test solutions were prepared having the following compositions:

(1) 1.5% benzyl alcohol
(2) 2.5% L-lysine HCl+1.5% benzyl alcohol
(3) 2.0% DL-methionine+1.5% benzyl alcohol
(4) 2.5% L-lysine HCl+2.0% DL-methionine+1.5% benzyl alcohol.

From Table II will be seen that the amino acid infused steers consistently gained more weight than their controls with the animals receiving methionine making the greatest gains. The feed efficiency data parallel the weight change data. Thus, it will be seen that very significant improvements in feed efficiency and weight gains can be obtained if supplementary amino acids can be made available posterior to the omasa of growing steers.

Mean values for some of the free amino acids in the blood plasma samples obtained from the steers at the conclusion of the experiment are presented in Table III.

TABLE III

|  | Control (p.p.m.) | Lysine (p.p.m.) | Methionine (p.p.m.) | Lysine and methionine (p.p.m.) |
|---|---|---|---|---|
| Lysine | 15.1 | 33.8 | 15.0 | 27.3 |
| Methionine | 5.0 | 5.1 | 114.2 | 96.0 |
| Cystine | 6.4 | 7.0 | 8.0 | 6.2 |

It is apparent from the above data that the infusion of lysine, either alone or in the presence of methionine, raised the level of free lysine in the plasma by about 100%. The methionine infusions raised the free methionine level by about 2,000%. However, the amount of free cystine was not changed. These data suggest that the change in free amino acid levels in the blood plasma can be used as a bioassay for screening orally administered amino acid preparations.

EXAMPLE 2

DL-methionine, kaolin and stearic acid were made into a slurry which was encapsulated in an hydrogenated vegetable fat (Setsquick) using a centrifugal extrusion device of the Southwest Research Institute, San Antonio, Texas. The resulting material consisted primarily of essentially spherical particles with a size range of 1,000 to 1,200 microns and a density of 1.1 to 1.2 gm./ml. The composition of the final product was:

|  | Percent |
|---|---|
| DL-methionine | 39.1 |
| Kaolin | 14.7 |
| Stearic acid | 44.0 |
| Setsquick | 2.2 |

EXAMPLE 3

Six, healthy, growing, Holstein-type steers receiving a hay: concentrate diet in the form of two meals per day were divided into 3 pairs. The first pair of animals served as a negative controls and received no supplement. The second pair of steers were the positive controls. During the experimental period each of the positive controls received 5 gm. of DL-methionine with each meal. The third pair of animals each received 5 gm. of DL-methionine, in the form of the material described in Example 2, at each meal during the experiment. The capsules and free methionine were administered as a drench directly into the oesophagus by means of a tube. Samples of blood plasma were obtained from each animal immediately prior to the start of the experiment (day 0) and immediately following the 4-day feeding test (day 4). The deproteinized blood plasma was assayed for methionine and valine. The results of the experiment are summarized in Table IV.

TABLE IV

| | Methionine | | Valine | | Methionine: valine ratio | |
|---|---|---|---|---|---|---|
| Day | 0 | 4 | 0 | 4 | 0 | 4 |
| Negative control: | | | | | | |
| A | 3.0 | 3.0 | 25.7 | 24.9 | 0.117 | 0.120 |
| B | 3.3 | 3.2 | 27.9 | 24.6 | 0.118 | 0.130 |
| Mean | 3.15 | 3.10 | 26.80 | 24.75 | 0.118 | 0.125 |
| Positive control: | | | | | | |
| A | 3.4 | 2.1 | 24.5 | 22.4 | 0.139 | 0.094 |
| B | 4.0 | 3.1 | 31.0 | 26.4 | 0.129 | 0.117 |
| Mean | 3.70 | 2.60 | 27.75 | 24.40 | 0.133 | 0.106 |
| Example 2: | | | | | | |
| A | 3.0 | 8.1 | 26.4 | 21.0 | 0.114 | 0.386 |
| B | 2.6 | 6.3 | 25.5 | 22.6 | 0.102 | 0.279 |
| Mean | 2.80 | 7.20 | 25.95 | 21.80 | 0.107 | 0.330 |

The data of Table IV show that methionine alone had little effect upon the free methionine content of the blood plasma while methionine as described in Example 2 induced a rise in the plasma methionine content. This proves that the modified encapsulated methionine was available for absorption. Since the amount of methionine capable of moving through the rumen wall is extremely small, it must be assumed that the encapsulated methionine was absorbed from the intestinal tract distal to the rumen. Methionine:valine ratios are a more sensitive measure of methionine absorption and confirm that the encapsulated methionine was utilized by the host whereas the free methionine was not.

A rise in this ratio indicates that methionine administered in the concentrate has been absorbed into the blood stream. The M/V ratio is more sensitive than the change in the plasma methionine level, since absorbed methionine may be used very rapidly if it is the first limiting amino acid. Under such conditions the observed change in the absolute methionine value may be very small; however, in utilizing the absorbed methionine it is probable that a portion of the free valine, normally present in excess, will also be utilized. Consequently, absorption of methionine may result in depressed valine levels and no changes in methionine levels.

A secondary reason for employing the M/V ratio is that it tends to eliminate much of the variation caused by factors such as a change in blood volume. It has been frequently observed that the plasma methionine levels of control animals may exhibit marked variation during an assay while their M/V ratios may show little or no variation.

EXAMPLE 4

The encapsulation procedure of Example 2 was repeated to form capsules having the following composition:

| | Percent |
|---|---|
| DL-methionine | 36.4 |
| Stearic acid | 39.5 |
| Kaolin | 13.7 |
| Hydrogenated vegetable fat | 10.4 |

The hydrogenated vegetable fat (Setsquick) formed the shell or outer coat of the capsules and the remaining components formed the core. The capsules had a particle size of <1190 microns and a density of 1.13 gm./ml.

EXAMPLE 5

A test was conducted to measure the responses of finishing steers to dietary supplements of encapsulated methionine prepared according to Example 4.

The tests involved three pens each containing 8 Hereford steers. The animals were alloted to the pens on a random basis with subsequent reallotment to ensure similar mean weights in each pen. The experiment lasted for 10 weeks during which time feed consumption per pen and individual animals weights were recorded at 7-day intervals. At the conclusion of the experiment the animals were slaughtered and their carcasses were graded. Cross sectional tracings of loins were made when the carcasses were quartered.

The steers were fed hay and a concentrate, the hay being initially fed on an ad libitum basis but as the intake of concentrate increased the hay intake was restricted. During the first eight weeks the composition of the concentrate of the diet was:

| | Percent |
|---|---|
| Rolled barley | 47.79 |
| Rolled oats | 50.33 |
| Mineral | 1.88 |

At the end of eight weeks the composition of the concentrate was changed to:

| | Percent |
|---|---|
| Rolled barley | 74.1 |
| Rolled oats | 24.7 |
| Mineral | 1.2 |

The methionine capsules were premixed with a portion of the concentrate and fed twice daily at levels of 7.2 and 14.4 gm. per head per day. The results of this test are given in Table V below:

TABLE V

| | Methionine capsules (gm./hd./day) | | | | | | | | |
|---|---|---|---|---|---|---|---|---|---|
| | 0 | | | 7.2 | | | 14.4 | | |
| Week | Average daily gain per steer (lb.) | Concentrate efficiency | Hay efficiency | Average daily gain per steer (lb.) | Concentrate efficiency | Hay efficiency | Average daily gain per steer (lb.) | Concentrate efficiency | Hay efficiency |
| 1 | 2.55 | 2.74 | 4.85 | 3.48 | 2.01 | 3.43 | 2.86 | 2.45 | 4.04 |
| 2 | 2.68 | 3.13 | 4.31 | 3.06 | 2.73 | 3.78 | 3.46 | 2.42 | 3.11 |
| 3 | 2.74 | 3.43 | 3.92 | 3.10 | 3.04 | 3.54 | 3.20 | 2.94 | 3.10 |
| 4 | 2.81 | 3.71 | 3.56 | 3.03 | 3.44 | 3.47 | 3.02 | 3.45 | 3.16 |
| 5 | 2.57 | 4.28 | 3.58 | 2.95 | 3.74 | 3.39 | 3.03 | 3.64 | 2.99 |
| 6 | 2.46 | 4.40 | 3.79 | 2.80 | 4.06 | 3.54 | 2.70 | 4.03 | 3.23 |
| 7 | 2.03 | 5.30 | 4.44 | 2.48 | 4.57 | 3.97 | 2.42 | 4.52 | 3.59 |
| 8 | 2.26 | 4.82 | 3.96 | 2.77 | 4.12 | 3.54 | 2.48 | 4.46 | 3.45 |
| 9 | 2.51 | 4.40 | 3.58 | 2.80 | 4.12 | 3.52 | 2.63 | 4.26 | 3.26 |
| 10 | 2.46 | 4.62 | 3.68 | 2.88 | 4.08 | 3.39 | 2.60 | 4.40 | 3.30 |

In the above table the concentrate efficiency was calculated by dividing the weight of concentrate consumed per pen by the weight gain of the animals contained therein, while the hay efficiency was calculated by dividing the weight of the hay consumed per pen by the weight gain of the animals contained therein. From this table it can be seen that the steers receiving encapsulated methionine grew at a faster rate than did the control animals. They also consumed less concentrate per pound of gain and their hay consumption per pound of gain was also lower than that of the controls.

Data obtained on the carcasses of the animals after slaughter are summarized in Table VI below:

TABLE VI

|  | Methionine capsules (gm./hd./day) | | |
| --- | --- | --- | --- |
|  | 0 | 7.2 | 14.4 |
| Number of animals | 8 | 7 | 8 |
| Shrunk live weight (lb.) | 900 | 920 | 901 |
| Hot carcass weight (lb.) | 512 | 524 | 517 |
| Hot dressing (percent) | 57 | 57 | 57 |
| Cold carcass weight (lb.) | 497 | 509 | 501 |
| Cold dressing (percent) | 55 | 55 | 56 |
| Loin eye area (sq. in.) | 9.98 | 11.08 | 11.46 |
| Lean/fat ratio | 2.59 | 2.70 | 3.09 |

The above table shows that the steers receiving encapsulated methionine showed improved loin eye areas and lean/fat ratios.

EXAMPLE 6

This test was conducted to measure the response of growing:fattening steers to encapsulated methionine prepared according to Example 4.

The test involved two pens of 225 western steers. One pen of animals served as the negative control while the other received the encapsulated methionine sprinkled on top of the feed at a level calculated to supply 4.0 gm. of methionine per head per day.

Initially the diet consisted of haylage, corn silage, distillers' grain and 0.2 lb. of concentrate per head per day. The concentrate was essentially a vitamin:mineral mix. Shortly after the test began the diet was changed to potatoes, ground corn cobs, oat straw, distillers' grain, haylage and sweet corn silage.

The animals were weighed at the start of the test and at the end of 30 days and the results obtained are summarized in Table VII below:

TABLE VII

|  | Control | Methionine capsules |
| --- | --- | --- |
| Number of steers per pen | 225 | 225 |
| Initial weight per pen (lb.) | 177,030 | 172,390 |
| Weight per pen after 30 days (lb.) | 191,240 | 188,550 |
| Gain per pen (lb.) | 14,210 | 16,160 |
| Average daily gain per head (lb.) | 2.10 | 2.39 |

From the above data it will be seen that the animals receiving encapsulated methionine gained 14% more weight per head per day than the controls.

EXAMPLE 7

The purpose of this experiment was to determine the stability of different capsules in the rumen of a living animal.

Preparation of capsules

The different capsules used were as follows:

Capsule A

|  | Percent |
| --- | --- |
| DL-methionine | 40.3 |
| Kaolin | 15.1 |
| Rice bran wax | 44.6 |

These capsules were made on a centrifugal extrusion device of the Southwest Research Institute, San Antonio, Tex., and had a particle size in the range of 354–707 microns. The rice bran wax was used in both the core and shell with about 10% in the shell.

Capsule B

|  | Percent |
| --- | --- |
| DL-methionine | 32.8 |
| Hydrogenated animal fat (Hyfac 2120) | 54.5 |
| Kaolin | 12.3 |

These capsules were also made on a centrifugal extrusion device and had a particle size in the range of 300–1000 microns and a density of 1.18 gm./ml. The hydrogenated animal fat was used both in the core and for the shell with 13.9% being the shell and 40.6% being contained in the core.

Capsule C

These were made in the same manner as Capsule B and had the following composition:

| DL-methionine | percent | 36.2 |
| --- | --- | --- |
| Hydrogenated animal fat (Hyfac 2120) | do | 50.2 |
| Kaolin | do | 13.6 |
| Particle sizes | (microns) | 300–1000 |
| Density | (gm./ml.) | 1.26 |

In these capsules 5.0% of the hydrogenated animal fat constituted the shell and 45.2% was in the core.

Capsule D

These were made in the same manner as Capsule B but without an outer shell. The composition was as follows:

| DL-methionine | percent | 38.1 |
| --- | --- | --- |
| Hydrogenated animal fat (Hyfac 2120) | do | 47.6 |
| Kaolin | do | 14.3 |
| Particle size | (microns) | 300–1000 |
| Density | (gm./ml.) | 1.26 |

Capsule E

These capsules were made by a fluidized bed technique and had the following composition:

Core

|  | Percent |
| --- | --- |
| DL-methionine | 40 |
| Kaolin | 15 |
| Stearic acid | 45 |

Outer shell

The outer shell was a hydrogenated vegetable fat and was applied by the fluidized bed technique. The outer shell represented 35% by weight of the final product and the particle size was in the range of 595–1005 microns.

Nylon bag test

Approximately 1 gm. of each of the above samples of capsules was accurately weighed into a 1 x 1.5 inch white nylon sail cloth bag which was then heat sealed. The bag plus capsules was then weighed prior to being immersed in the rumen contents of a living steer. The immersion was achieved by attaching the bag to a carrier which was inserted through a rumen fistula into the rumen contents. Movement of the carrier was restricted by a nylon cord attached to the rumen cannula.

After a predetermined immersion period the bag was removed from the rumen, washed in running water to remove adhering material and fine particles which may have entered the bag, and air dried. The dried bag plus remaining contents was weighed. The change in weight was used to compute the percentage weight loss of capsules during immersion in the rumen contents.

Samples of capsules placed in the bags, together with samples of the recovered capsules were assayed for nitrogen content. The nitrogen loss of the capsules following immersion in the rumen was then calculated as follows:

Initial wt. of nitrogen=wt. of capsules placed in bag × percent nitrogen contained in capsules.

Recovered wt. of nitrogen=wt. of capsules recovered from bag × percent nitrogen contained in recovered capsules.

Percent nitrogen loss during immersion =

$$\frac{\text{(Initial wt. of nitrogen} - \text{Recovered wt. of nitrogen)} \times 100}{\text{Initial wt. of nitrogen}}$$

Since most of the nitrogen in the capsules is in the form of methionine, the nitrogen loss reflects the ability of the capsules to protect methionine during exposure to rumen contents in a living steer.

In the evaluation of a sample, nine bags of capsules were prepared. Three bags were attached to each of three carriers and all carriers were immersed in the contents of a rumen. Carriers with bags attached were removed 6, 12 and 24 hours after placement in the rumen. This allowed three observations to be made at each of three times.

Mean data obtained from the nylon bag studies are presented in Table VIII below:

TABLE VIII.—PERIOD OF RUMEN IMMERSION (HOURS)

| Capsule sample | Capsule weight loss (percent) | | | Capsule nitrogen loss (percent) | | |
|---|---|---|---|---|---|---|
| | 6 | 12 | 24 | 6 | 12 | 24 |
| A | 6 | 12 | 20 | | | |
| B | 2 | 9 | 18 | 3 | 28 | 55 |
| C | 3 | 9 | 22 | 5 | 23 | 54 |
| D | 4 | 15 | 24 | | | |
| E | 3 | 7 | 15 | 10 | 17 | 42 |

The above data shows that all of these capsules were able to protect a large proportion of the methionine for up to 12 hours in the rumen.

EXAMPLE 8

Capsules B, C and D from Example 7 were fed to growing steers to determine their effects on blood plasma.

The steers were acclimatized to a hay:concentrate diet, the weight of concentrate fed being equal to 20% by weight of the hay consumption of the previous day. The daily allowance of concentrate was divided into two equal portions which were offered to the animal at 8:00 and 16:00 hours, respectively. Negative control animals were maintained on the standard diet. The test animals were also maintained on the standard diet, with the modification that methionine was added to each meal of concentrate in the form of capsules B, C and D, in an amount equivalent to 12 grams of methionine per head per day.

Venous blood samples were obtained from each animal immediately prior to the 8:00 hour feed of concentrate on day zero and 77 hours thereafter. Plasma obtained from the blood was deproteinized and assayed for various amino acids including methionine and valine.

In calculating response data, each animal serves as its own control. The negative control animals were included in each assay to reflect variation caused by factors other than those under study.

The results obtained are shown in Table IX below:

TABLE IX

| Capsule sample | Methionine (p.p.m.) | | | Methionine:valine ratio | | |
|---|---|---|---|---|---|---|
| | Initial | Final | Change | Initial | Final | Change |
| None | 3.58 | 3.25 | −0.32 | .135 | .136 | +.001 |
| B | 2.82 | 5.00 | +2.18 | .112 | .187 | +.075 |
| C | 2.90 | 4.13 | +1.23 | .111 | .173 | +.063 |
| D | 3.33 | 4.03 | +1.03 | .133 | .178 | +.045 |

The above data illustrates the importance of the protective material. Although all three capsules B, C and D showed positive responses, it will be noted that capsules D, which did not have a distinct outer shell, gave the poorest results while capsules B with the thickest outer shell showed the best results.

EXAMPLE 9

(a) Capsules were formed having the following composition:

| | Percent |
|---|---|
| L-lysine mono-hydrochloride | 17.6 |
| Kaolin | 17.6 |
| Rice bran wax | 64.8 |

The rice bran wax was used in both the core and shell with 10.0% forming the shell and 54.8% being in the core.

The capsules were made on a centrifugal extrusion device and had a particle size in the range of 1000–1400 microns and a density of 1.17 gm./ml.

These capsules were subjected to nylon bag tests in the same manner as described in Example 7 with three samples being removed and analysed at the end of each time period.

The averages of the results obtained are listed in Table X below:

TABLE X

| Period of rumen immersion (hours) | Capsule weight loss (percent) | Lysine loss (percent) |
|---|---|---|
| 6 | 4 | 15 |
| 12 | 6 | 25 |
| 24 | 8 | 41 |

(b) The procedure of part (a) was repeated but the capsules produced had a particle size range of 800–1400 microns.

The averages of results obtained in nylon bag tests are listed in Table XI below:

TABLE XI

| Period of rumen immersion (hours) | Capsule weight loss (percent) | Lysine loss (percent) |
|---|---|---|
| 6 | 3 | 18 |
| 12 | 4 | 33 |
| 24 | 9 | 51 |

(c) The capsules from parts (a) and (b) were fed to growing steers in a quantity equivalent to 13 gm. of L-lysine per head per day. This was divided into two meals and was fed with the concentrate portion of the diet in the same manner as described in Example 8.

Samples of blood plasma were obtained from each animal immediately prior to the start of the experiment (day 0) and immediately following a 3-day feeding test (day 3). The deproteinized blood plasma was assayed for lysine and the results are summarized in Table XII below:

TABLE XII

| Treatment | Lysine, p.p.m. | |
|---|---|---|
| | Day 0 | Day 3 |
| Part (a) capsules | 11.5 | 15.8 |
| Part (b) capsules | 16.4 | 24.9 |

EXAMPLE 10

(a) Abomasal infusion of methionine hydroxy analogue.

The purpose of this test was to determine whether the calcium salt of methionine hydroxy analogue (M.H.A.) entering the abomasum of a steer could serve as a precursor of methionine.

The experiment was of a randomized block design with 4 treatments and two replications. The test animals were growing Holstein-type steers fitted with abomasal cannulae. The standard bioassay diet comprising hay and concentrate was fed twice daily in equal amounts.

During the 4-day experimental period each animal was infused per abomasum with 500 ml. of a 1.5% solution of benzoyl alcohol in distilled water. The animals of the first treatment group received no additional supplement and served as negative controls. The second treatment was similar to the first but included the administration of 10 g. of M.H.A. per head per day in the concentrate portion of the diet. The third and fourth treatments involved the infusion, per abomasum, of 10 g. per head per day of M.H.A. and DL-methionine, respectively. Because the M.H.A. used was of low solubility an attempt was made to convert it from the calcium salt to the acid form by treatment with hydrochloric acid. This increased solubility and allowed the preparation of an M.H.A.:benzoyl alcohol:distilled water solution suitable for infusion; however, the final concentration of M.H.A. was probably lower than that intended which means that the animals of treatment three received less than 10 g. of M.H.A. per day.

Venous blood samples were taken from each animal at 8:00 hours on day zero immediately prior to the start of the infusions. A second set of samples was collected 77 hours later. The deproteinized blood plasma was assayed for methionine and valine.

The capsules obtained had a diameter range of 300–800 microns and a density of 1.21 gm./ml. Microscopic examination showed that the capsules were smooth and shiny and less than 3% of the capsules had holes or cracks.

(c) Twelve healthy growing steers received a hay:concentrate diet in the form of two meals per day were divided into 3 groups. The first group of animals served as negative controls and received no supplement. The second group of animals were the positive controls and received 15 grams per head per day of free M.H.A. divided between two meals. The third group received the capsules of part (b) in an amount of 83.3 grams (equivalent to 15 grams of M.H.A.) per head per day divided into two meals.

Samples of blood plasma were obtained from each animal immediately prior to the start of the experiment (day 0) and immediately following a 3-day feeding test (day 3). The deproteinized blood plasma was assayed for methionine and valine and the results are summarized in Table XIV below.

TABLE XIV.—AMINO ACIDS IN DEPROTEINIZED BOVINE BLOOD PLASMA

| Treatment (g./head/day) | Replication | Day 0 (1,300 hours) | | | Day 3 (1,300 hours) | | | Change | |
|---|---|---|---|---|---|---|---|---|---|
| | | Methionine (p.p.m.) | Valine (p.p.m.) | M/V | Methionine (p.p.m.) | Valine (p.p.m.) | M/V | Methionine (p.p.m.) | M/V |
| None | A | 3.9 | 26.4 | .148 | 3.0 | 23.2 | .129 | −0.9 | −.016 |
| | B | 2.8 | 24.0 | .117 | 2.3 | 22.5 | .102 | −0.5 | −.015 |
| | C | 2.5 | 23.5 | .106 | 2.9 | 24.5 | .118 | +0.4 | +.012 |
| | D | 3.3 | 25.6 | .129 | 2.8 | 25.6 | .109 | −0.5 | −.020 |
| | Mean | 3.12 | 24.88 | .125 | 2.75 | 23.95 | .114 | −0.38 | −.010 |
| 15 g. MHA | A | 3.2 | 25.3 | .126 | 2.6 | 22.2 | .117 | −0.6 | −.009 |
| | B | 2.7 | 20.7 | .130 | 2.4 | 16.9 | .142 | −0.3 | +.012 |
| | C | 2.5 | 25.2 | .099 | 2.3 | 25.4 | .091 | −0.2 | −.008 |
| | D | 3.3 | 24.1 | .137 | 2.7 | 27.8 | .133 | −0.6 | −.004 |
| | Mean | 2.92 | 23.82 | .123 | 2.50 | 23.08 | .121 | −0.42 | −.002 |
| 83.3 g. capsules [1] | A | 2.3 | 20.9 | .110 | 4.8 | 21.0 | .228 | +2.5 | +.118 |
| | B | 3.0 | 26.6 | .113 | 2.9 | 16.9 | .172 | −0.1 | +.059 |
| | C | 1.8 | 17.0 | .106 | 3.4 | 15.5 | .219 | +1.6 | +.113 |
| | D | 3.2 | 29.4 | .109 | 3.8 | 22.2 | .171 | +0.6 | +.062 |
| | Mean | 2.58 | 23.48 | .110 | 3.72 | 18.90 | .198 | +1.15 | +.088 |

[1] Equivalent to 15 g. of MHA per head per day.

The analyses of the 77 hour blood samples yielded the data in Table XIII below.

TABLE XIII

| Treatment | Replication | Plasma methionine (p.p.m.) | Plasma valine (p.p.m.) | Methionine: valine ratio |
|---|---|---|---|---|
| Control | A | 3.6 | 29.2 | .123 |
| | B | 3.2 | 25.4 | .126 |
| | Mean | 3.4 | 27.3 | .124 |
| Oral M.H.A. | A | 3.5 | 29.5 | .119 |
| | B | 4.3 | 32.8 | .131 |
| | Mean | 3.9 | 31.2 | .125 |
| Infused M.H.A. | A | 6.3 | 29.9 | .210 |
| | B | 5.1 | 21.2 | .240 |
| | Mean | 5.7 | 25.6 | .225 |
| Infused methionine | A | 7.6 | 21.9 | .347 |
| | B | 12.0 | 20.7 | .580 |
| | Mean | 9.8 | 21.3 | .464 |

The data demonstrate that the infusion of M.H.A. raised the free methionine content of the blood plasma and caused a marked increase in the methionine:valine ratio.

(b) Production of M.H.A. capsules.

Capsules were made on a centrifugal extrusion device and had the following calculated composition:

| | Percent |
|---|---|
| M.H.A. (Monsanto) | 18 |
| Kaolin | 18 |
| Hydrogenated animal fat (Hyfac 2120) | 64 |

Of the Hyfac 2120 used 10% formed the outer shell, and 54% was in the core.

EXAMPLE 11

(a) Capsules were produced having the following composition:

| | Percent |
|---|---|
| DL-methionine | 18.0 |
| Hyfac 2120 | 64.0 |
| Kaolin | 18.0 |

The outer shell constituted 10.0% of the Hyfac 2120 and the core contained 54.0%.

The capsules were made on a centrifugal extrusion device and had a particle diameter range of 300–1000 microns and a density of 1.183 gm./ml.

(b) Eight healthy growing steers receiving a hay:concentrate diet in the form of two meals per day were divided into 2 groups. The first group of animals served as negative controls and received no supplement. The second group of steers were the test animals.

During the experimental period the test animals received the capsules from part (a) in an amount of equivalent to 12.45 grams of methionine per head per day, divided into two meals and fed with the concentrate portion of the diet.

Samples of blood plasma were obtained from each animal immediately prior to the start of the experiment (day 0) and immediately following a 3-day feeding test (day 3). The deproteinized blood plasma was assayed for methionine and valine. The results of the experiment are summarized in Table XV.

0) and immediately following the 3-day feeding test (day 3). The deprotienized blood plasma was assayed for

TABLE XV

| Methionine g./head/ day | Replication | Methionine (p.p.m.) | | | Methionine:valine ratio | | |
|---|---|---|---|---|---|---|---|
| | | Initial | Final | Change | Initial | Final | Change |
| 0 | A | 2.2 | 3.6 | +1.4 | .080 | .105 | +.025 |
| | B | 5.4 | 4.7 | −0.7 | .139 | .145 | +.006 |
| | C | 4.4 | 3.8 | −0.6 | .124 | .129 | +.005 |
| | D | 2.9 | 3.4 | +0.5 | .103 | .123 | +.020 |
| | Mean | 3.72 | 3.88 | +0.5 | .112 | .126 | +.014 |
| 12.45 | A | 3.6 | 3.9 | +0.3 | .111 | .138 | +.027 |
| | B | 4.9 | 4.9 | 0.0 | .129 | .186 | +.057 |
| | C | 4.1 | 5.5 | +1.4 | .121 | .194 | +.073 |
| | D | 3.1 | 4.9 | +1.8 | .112 | .158 | +.046 |
| | Mean | 3.92 | 4.80 | +0.88 | .118 | .169 | +.051 |

EXAMPLE 12

The purpose of this example was to determine the effects of certain additional components in capsule cores and shells.

(a) Capsules were formed having the following composition:

| | Percent |
|---|---|
| DL-methionine | 38.0 |
| Kaolin | 14.2 |
| Rice bran wax | 21.4 |
| Staybelite ester 10 [1] | 21.4 |
| Shell | 5.0 |

[1] Glycerol esters of hydrogenated rosin produced by Hercules Powder Co., Inc.

The shell contained the following components:

| | Percent |
|---|---|
| Rice ban wax | 55 |
| Staybelite ester 10 | 40 |
| Epolene C-10 [2] | 5 |

[2] Low molecular weight polyethylene produced by Eastman Chemical Products, Inc.

The capsules were made on a centrifugal extrusion device and had a particle diameter in the range of 420–840 microns and a density of 1.226 gm./ml.

(b) Nylon bag studies were conducted on the above capsules using the producedure described in Example 7. The data obtained are presented in Table XVI below:

TABLE XVI.—PERIOD OF IMMERSION IN RUMEN (HOURS)

| | Capsule weight loss (percent) | | | Capsule nitrogen loss (percent) | | |
|---|---|---|---|---|---|---|
| Replication | 6 | 12 | 24 | 6 | 12 | 24 |
| A | 3 | 8 | 6 | 16 | 26 | 25 |
| B | 4 | 6 | 7 | 20 | 26 | 24 |
| C | 4 | 8 | 8 | 15 | 24 | 22 |
| Mean | 4 | 7 | 7 | 17 | 25 | 24 |

(c) Free plasma amino acid data was also obtained on the above capsules.

To obtain this data healthy growing steers receiving a hay:concentrate diet in the form of two meals per day were divided into 2 groups. The first group of animals served as controls and received no supplement. The second group received the capsules in an amount equivalent to 8.80 grams of methionine per head per day divided into two meals and fed with the concentrate portion of the diet.

Samples of blood plasma were obtained from each animal immediately prior to the start of experiment (day methionine and valine and the mean values obtained are summarized in Table XVII below.

TABLE XVII

| Animals | Methionine (p.p.m.) | | | Methionine: valine ratio | | |
|---|---|---|---|---|---|---|
| | Initial | Final | Change | Initial | Final | Change |
| Control | 2.95 | 2.52 | −0.42 | .111 | .116 | +.006 |
| Test | 2.50 | 4.12 | +1.62 | .098 | .199 | +.101 |

EXAMPLE 13

This test was conduted to evaluate encapsulated methionine as a supplement for grazing steers.

Capsules were produced on a centrifugal extrusion device and had the following composition:

| | Percent |
|---|---|
| DL-methionine | 18.7 |
| Kaolin | 18.7 |
| Hyfac 2120 | 62.6 |

The Hyfac 2120 was used both in the core and for the shell with 6.5% being the shell and 56.1% being contained in the core.

The capsules had a density of 1.177 g./ml. and a particle size in the range of 300–1400 microns.

One hundred and four Hereford steers were ear tagged, weighed on two successive days and randomized into two groups on the basis of their minimum recorded weight. Animals from different genetic sources were distributed evenly between the two groups.

The grazing trial was initiated on May 30, 1968, with each group being given access to pastures of uniform size and composition. Furthermore, the animals were switched between pastures at weekly intervals to reduce bias. Cattle oilers were available for both groups and mineral salt mixture (50:50) was supplied on an ad lib basis.

The encapsulated methionine was administered to the treated group by incorporation into a premix with ground corn, which was fed at 500 g./hd/day to provide 10 gm. of DL-methionine/hd/day. The control group received an equivalent amount (450 g.) of ground corn, without added encapsulated methionine. The composition of the premix was:

| Ingredient: | Percent |
|---|---|
| Ground corn | 90 |
| Capsules | 10 |

Animals were weighed at 28-day intervals, and weight gains recorded by periods and cumulatively.

Results are presented in Table XVIII below:

TABLE XVIII.—CUMULATIVE GROWTH PERFORMANCE

| Item | Control | Treated |
|---|---|---|
| Initial weight (May 30) (kg.) | 12,848 | 12,429 |
| Final weight (Aug. 23) (kg.) | 15,326 | 15,160 |
| Gain | 2,478 | 2,731 |
| Animal days on test | 4,420 | 4,350 |
| Cumulative average daily gain (kg.) | 0.561 | 0.628 |

Note: Difference between treated and control=0.067 kg.; percent improvement=12%.

GROWTH PERFORMANCE BY PERIOD

| Period | Weight gain (kg.) | | Animal days [1] on test | | Average daily gain (kg.) | |
|---|---|---|---|---|---|---|
| | Control | Treated | Control | Treated | Control | Treated |
| 1. May 30–June 27 | 1,188 | 1,242 | 1,456 | 1,428 | 0.816 | 0.870 |
| 2. June 27–July 25 | 767 | 924 | 1,456 | 1,428 | 0.527 | 0.647 |
| 3. July 25–Aug. 23 | 523 | 565 | 1,508 | 1,479 | 0.347 | 0.382 |

[1] The apparent discrepancy between the data for control and treated groups arose from the fact that one animal in the treated group was stolen early in the experiment.

EXAMPLE 14

The purpose of this test was to determine whether air prills would protect methionine in the rumen.

(a) Air prills were produced having the following composition:

| | Percent |
|---|---|
| DL-methionine | 40 |
| Kaolin | 15 |
| Hydrogenated vegetable fat (Sterotex K) | 40 |
| Acylated monoglyceride (Myvacet 7.00) | 5 |
| Density (g./ml.) 1.224. | |

The prills were produced by forming droplets of the mixture in a melt atomizer which were allowed to fall through a countercurrent air flow in a 12-foot high prilling tower.

(b) A portion of the prills produced according to part (a) were coated with atomized Sterotex K in a fluidized bed.

(c) Free plasma amino acid data was obtained on the capsules from parts (a) and (b).

To obtain this data, healthy growing steers receiving a hay:concentrate diet in the form of two meals per day were divided into 3 groups. The first group of animals served as controls and received no supplement, the second group received the capsules from part (a) in an amount equivalent to 10.42 grams of methionine per head per day and the third group received the capsules from part (b) in an amount equivalent to 10.61 grams of methionine per head per day. The capsules were fed to the second and third groups with the concentrate portion of the diet twice daily.

Samples of blood plasma were obtained from each animal immediately prior to start of the experiment (day 0) and immediately following a 3-day feeding test (day 3). The deproteinized blood plasma was assayed for methionine and valine and the mean values obtained are summarized in Table XIX below.

TABLE XIX

| Animals | Methionine (p.p.m.) | | | Methionine:valine ratio | | |
|---|---|---|---|---|---|---|
| | Initial | Final | Change | Initial | Final | Change |
| Control | 2.78 | 2.42 | −0.36 | 0.120 | 0.129 | +0.009 |
| First group | 2.65 | 3.82 | +1.17 | 0.116 | 0.206 | +0.090 |
| Second group | 3.28 | 4.20 | +0.92 | 0.132 | 0.228 | +0.096 |

EXAMPLE 15

This test was conducted to study the effectiveness of weighting agents other than Kaolin.

(a) Two batches of capsules were prepared on a centrifugal extrusion device and had the following compositions:

Batch A:

| | Percent |
|---|---|
| DL-methionine | 18.0 |
| Chromium sesquioxide | 15.3 |
| Hyfac 2120 | 66.7 |

The Hyfac 2120 was used both in the core and for the shell with 10% being the shell and 56.7% being contained in the core. The capsules had a density of 1.206 g./ml. and particle size in the range of 600–800 microns.

Batch B:

| | Percent |
|---|---|
| DL-methionine | 18.0 |
| Barium sulfate | 15.8 |
| Hyfac 2120 | 66.2 |

The Hyfac 2120 was used both in the core and for the shell with 10% being the shell and 56.2% being contained in the core. The capsules had a density of 1.212 g./ml. and particle size in the range of 600–800 microns.

(b) Blood plasma amino acid data was obtained on these batches in the same manner as in Example 14 with the capsules being fed to supply 10 grams of methionine per head per day in two meals.

The deproteinized blood plasma was assayed for methionine and valine and the mean values obtained are summarized in Table XX below.

TABLE XX

| Animals | Methionine (p.p.m.) | | | Methionine:valine ratio | | |
|---|---|---|---|---|---|---|
| | Initial | Final | Change | Initial | Final | Change |
| Control | 2.80 | 2.45 | −0.35 | 0.095 | 0.084 | −0.11 |
| Group receiving Batch A | 2.90 | 3.82 | +0.92 | 0.106 | 0.166 | +0.060 |
| Group receiving Batch B | 2.88 | 4.10 | +1.22 | 0.106 | 0.160 | +0.054 |

EXAMPLE 16

(a) Capsules were produced on a centrifugal extrusion device and had the following composition:

| | Percent |
|---|---|
| Chlortetracycline | 18.0 |
| Kaolin | 18.0 |
| Hyfac 2120 | 64.0 |

The Hyfac 2120 was used both in the core and for the shell with 10.0% being the shell and 54.0% being contained in the core. The capsules had a density of 1.228 g./ml. and particle size in the range of 600–800 microns.

(b) A water leaching test was conducted on the capsules to determine whether the chlortetracycline was encapsulated.

Approximately 0.25 gm. of capsules were accurately weighed into a glass vial to which 5 ml. of distilled water was then added. The vial was stoppered and placed in a shaking water bath maintained at 39° C. Upon removal from the water bath the contents of the vial were filtered through No. 4 filter paper. The filtrate was collected in a preweighed, 25 ml. Erlenmyer flask and reduced to dryness by placing in an oven maintained at 75° C. The weight of dry residue in the flask was expressed as a percentage of the weight of capsules placed in the vial. The resulting value was termed the leaching loss.

Leaching losses were measured after 6 and 24 hours of shaking in warm water with each measurement being the mean of three replications. The results were as follows:

| Leaching time (hours): | Weight loss, percent |
|---|---|
| 6 | 1.87 |
| 24 | 7.23 |

EXAMPLE 17

(a) Capsules were produced on a centrifugal extrusion device and had the following composition:

| | Percent |
|---|---|
| Procaine penicillin G | 18.0 |
| Hyfac 2120 | 82.0 |

The Hyfac 2120 was used both in the core and for the shell with 10.0% being the shell and 72.0% being contained in the core. The capsules had a density of 1.034 g./ml. and particle size in the range of 600–800 microns.

(b) These capsules were subjected to a water leaching test in the same manner as described in Example 16(b). The results were as follows:

| Leach time (hours): | Weight loss, percent |
|---|---|
| 6 | 0.57 |
| 24 | 0.61 |

What we claim as our invention is:

1. A controlled release capsule of particulate composition for feeding to ruminants, each particle thereof comprising a biologically active methionine and/or lysine amino acid additive for ruminant feed material totally encased in a continuous film consisting essentially of at least one material selected from the class consisting of a hydrogenated vegetable fat, a hydrogenated animal fat and rice bran wax as a protective material which is transportable through the rumen without substantial degradation therein but which releases the active substance posterior to the omasum, said particles having a density in the range of about 0.8 to about 2.0 and diameters in the range of about 200 to about 2000 microns, the density of said capsule being sufficient to ensure that it does not remain floating on the surface of the rumen contents for an undue period of time but not so great that said capsule falls to the floor of the rumen and remains there, said capsule density being conveniently regulated by the addition of a high density weighting agent.

2. A composition according to claim 1 in the form of capsules comprising a core containing biologically active material and an outer shell of productive material.

3. A composition according to claim 1 in the form of particles in which the biologically active material is encapsulated in pockets in a matrix of protective material.

4. A composition according to claim 1 wherein the particles have a density of about 1.0 to 1.4.

5. A composition according to claim 1 wherein the amino acid is methionine.

6. A composition according to claim 1 wherein the amino acid is lysine.

7. A composition according to claim 1 wherein the amino acid is methionine hydroxy analogue.

8. A composition according to claim 1 wherein the weighting agent is selected from kaolin, chromium sesquioxide and barium sulfate.

9. A composition according to claim 1 incorporated in a ruminant feed.

10. A composition according to claim 1 admixed with animal feed mineral.

11. A method of increasing the feeding efficiency of ruminants which comprises orally administering thereto a controlled release capsule of particulate composition, in accordance with claim 1, each particle thereof comprising a core of methionine and/or lysine amino acid additive for ruminant feed encapsulated in a material consisting essentially of at least one material selected from the class consisting of a hydrogenated vegetable fat, a hydrogenated animal fat and rice bran wax as a protective material which is substantially immune to degradation in the rumen but which is adapted to release the amino acid posterior to the omasum and each said particle having a density in the range of about 0.8 to about 2.0 and diameters in the range of about 200 to about 2000 microns, the density of said capsule being sufficient to ensure that it does not remain floating on the surface of the rumen contents for an undue period of time but not so great that said capsule falls to the floor of the rumen and remains there, said capsule density being conveniently regulated by the addition of a high density weighting agent, so that the particles are carried through the rumen without substantial change and are carried to a location posterior to the omasum where a substantial portion of the encapsulating material is modified and the amino acid is released for absorption by the animal.

References Cited
UNITED STATES PATENTS

| | | | |
|---|---|---|---|
| 2,344,229 | 3/1944 | Block et al. | 99—2 |
| 3,056,724 | 10/1962 | Marston | 424—22 |
| 3,080,292 | 3/1963 | Koff | 424—38 |
| 3,265,629 | 8/1966 | Jensen | 424—31 XR |

FOREIGN PATENTS

| | | |
|---|---|---|
| 936,386 | 9/1963 | Great Britain. |

OTHER REFERENCES

Skerman et al., Am. J. Vet. Res. 20; 977–984, November 1959.

SHEP K. ROSE, Primary Examiner

U.S. Cl. X.R.

99—2, 14, 166; 424—319